United States Patent [19]
Chavet

[11] 3,757,962
[45] Sept. 11, 1973

[54] CONTROL MECHANISM FOR THE FINE POSITIONAL ADJUSTMENT OF AN OBJECT
[75] Inventor: Itzhak Chavet, Rehovoth, Israel
[73] Assignee: The State of Israel, Atomic Energy Commission, Ramat Avin, Israel
[22] Filed: Nov. 17, 1971
[21] Appl. No.: 199,424

[30] Foreign Application Priority Data
Nov. 19, 1970 Israel.................................... 35691

[52] U.S. Cl................. 214/1 CM, 214/1 B, 350/86
[51] Int. Cl............................................... B25j 7/00
[58] Field of Search.............. 214/1 CM, 1 BB, 1 B, 214/1 BC, 1 BD, 1 BT; 350/86, 90

[56] References Cited
UNITED STATES PATENTS
2,809,769 10/1957 Clarke............................. 214/1 BT
3,209,922 10/1965 Melvin............................. 214/1 BD
3,370,845 2/1968 Newcomb..................... 214/1 BT X
3,155,383 11/1964 Whitmore............................ 350/86

Primary Examiner—Gerald M. Forlenza
Assistant Examiner—George F. Abraham
Attorney—Morris Kirschstein, Bertram Ottinger et al.

[57] ABSTRACT

A control mechanism for the fine positional adjustment of an object, in at least two substantially perpendicular directions, substantially independently of each other, particularly for adjusting the position of objects inside sealed systems (e.g. vacuum-tight, pressure-tight or radiation-tight systems) by manipulation of controls outside of the systems whose motions can be transmitted into the sealed system through suitably tight seals.

7 Claims, 11 Drawing Figures

Patented Sept. 11, 1973

CONTROL MECHANISM FOR THE FINE POSITIONAL ADJUSTMENT OF AN OBJECT

The invention relates to a control mechanism for the fine positional adjustment of an object, in at least two substantially perpendicular directions, substantially independently of each other.

The mechanism is particularly but not exclusively designed for use in such cases where compactness and relative simplicity are required and where relatively remote positioning control is to be achieved.

As an example, such a mechanism is particularly required for adjusting the position of objects inside sealed systems (e.g. vacuum-tight, pressure-tight or radiation-tight systems) by manipulation of controls outside of the systems whose motions can be transmitted into the sealed system through suitably tight seals. Thus, the mechanism can be required to effect fine adjustment of the position of electrodes in mass spectrometers, mass separators and the like, for the focusing and centering of components in optical systems etc.

According to the present invention there is provided a control mechanism for the fine positional adjustment of an object comprising a pair of levers, one end of each lever being articulated to a frame so as to be displaceable with respect thereto along a path, both paths being substantially parallel or coaligned, the other end of one lever being articulated to the other lever at an intermediate position thereof, the other end of the other lever being adapted to be coupled to an object to be positioned, and displacing means for independently displacing said one end of said levers along their respective paths.

For a better understanding of the present invention and to show how the same can be carried out in practice reference will now be made to the accompanying drawings in which.

Figure 1:
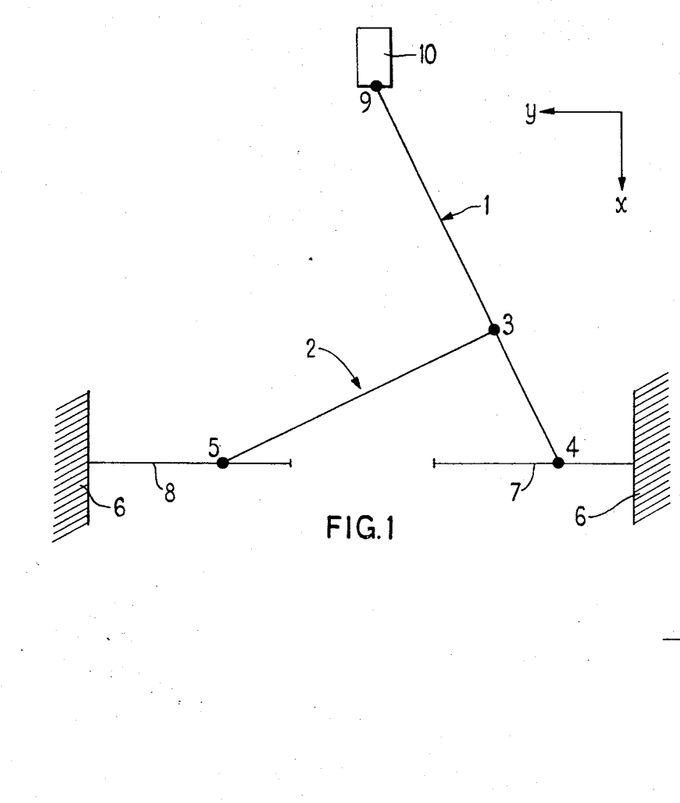
FIG. 1 is a schematic representation of the basic form of control mechanism in accordance with the invention.

As shown in FIG. 1 a first lever 1 and a second and shorter lever 2 are articulated together at a point 3. One pair of ends of the levers 1 and 2 respectively are pivoted with respect to a fixed frame 6 at pivots 4 and 5, in such a manner that pivots 4 and 5 can be displaced along predetermined paths 7 and 8, respectively, while the free end 9 of the lever 1 is coupled to an object 10 which is to be positioned. Paths 7 and 8 are substantially parallel and their direction will be designated herein as the y-direction in the plane passing through the points 4, 5 and 9; the z-direction will be defined as the third orthogonal one, i.e. perpendicular to this plane.

When both pivots 4 and 5 are moved together along their respective paths 7 and 8, their mutual distance 4–5 being kept constant, point 9 and any object connected to it will be displaced in the y-direction in the same sense and by the same amount as points 4 and 5. If, on the other hand, a relative movement is imparted to the pivots 4 and 5 in the y-direction thereby changing their distance apart, this will result in a displacement of point 9, which is attached to the object, substantially in the x-direction. Depending on the actual geometry of the system and on the exact manner in which pivots 4 and 5 are displaced, the x-displacement of point 9 may be accompanied by a small y-displacement, which however, can be disregarded as long as the x-displacement remains within certain limits.

In the special case where pivot-point 3 is located at the exact centre of the long lever 1 and where the distance between 3 and 5 is equal to the distance between 3 and 4, a displacement of point 4 along its path 7 while point 5 is kept fixed, will result in a pure x-displacement of point 9, without any accompanying y-displacement.

It is thus seen that the basic mechanism of FIG. 1 permits the positional adjustment of an object attached to point 9 in both the x- and the y-directions, substantially independently of each other. To this end it suffices that levers 1 and 2 be rotatable at the pivot-points 4 and 5, respectively, about axes which are parallel to the z direction and that the first point 4 is displaceable along the path 7.

If now, in accordance with a development of the basic mechanism, described above, the levers 1 and 2 are pivoted at 4 and 5 respectively, so that they can also rotate about axes parallel to their direction, i.e. coinciding with their paths 7, 8 then a slight rotation of the levers 1 and 2 about these axes will cause a translation of point 9 substantially in the z-direction. Provided that such a z-translation is relatively small, it will in practice hardly affect the position of point 9 in the x an y-directions.

A further elaboration of the invention permits, in addition to the above described displacements in two or three directions, the rotation of the body to be positioned, about two axes parallel to both the x and the y directions, respectively. Thus, in this embodiment the mechanism comprises a pair of basic systems, each one similar to that shown in FIG. 1 disposed in such a spatial relationship so that components 1, 2, 7 and 8 of one system are substantially parallel, respectively, to the corresponding components 1', 2', 7' (not shown) and 8' (not shown) of the second system. Point 9 and the corresponding point 9' of the second system, are articulated respectively, to two opposite terminal points of the object to be positioned, so that the latter can rotate at these points about any axis parallel to the z direction.

If now both pivots 4 and 5 of one of the basis systems are moved together in the y-direction while the pivots 4' and 5' in the other system are kept fixed, point 9 as explained above, will be displaced in the y-direction relative to point 9', the result being that the object will be rotated about an axis parallel to the x-direction. Similarly if the point 9 is displaced in the x-direction relative to 9' (by suitable displacements of the pivots 4 and 5) — the object will undergo rotation about an axis parallel to the y-direction.

There will now be described, by way of example, one embodiment of a control system in accordance with the invention and designed for the positioning of an extraction electrode in an isotope mass separator of the electro magnetic type.

This embodiment constitutes a reduction to practice of the basic modes of operation schematically illustrated and explained above.

Before proceeding with a detailed description of the control system and its mode of operation, a preliminary description will be given of the basic system and its mode of operation with reference to the schematic drawings in FIGS. 2 to 7.

As seen in these drawings the extraction electrode 11 is essentially a plate provided with an elongated slit parallel to the $\bar{z}$-direction. The system therefore does not have to provide for a displacement of the electrode in the $\bar{z}$-direction but, as will be seen, is nevertheless capable of doing so if required. On the other hand the system is required to include means for rotation of the electrode about the $\bar{z}$-axis, in addition to rotations about and translational displacement along the $x$ and $y$-axes.

Figure 2:
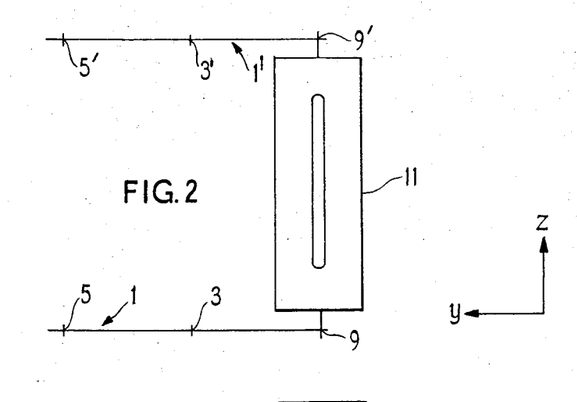
FIGS. 2 to 7 are schematic representations of an extraction electrode positioning control system in accordance with the invention.
Figure 3:
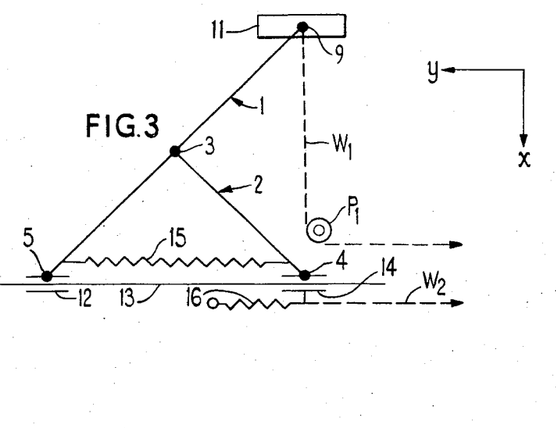

FIGS. 2 and 3 of the drawings show the mounting of the extraction electrode 11 so as to facilitate translational displacements in the $x$ and $y$-directions. In a similar manner to that described above with reference to FIG. 1 of the drawings, the electrode 11 is pivotally coupled at both ends thereof at pivotal positions 9, 9' to levers 1 and 1' whose opposite ends are pivoted at 5, 5' to sliders 12 which are displaceable in the $y$-direction along parallel paths 13. Levers 2, 2' are pivotally coupled at 3 and 3' to the mid point of the levers 1 and 1' and at the other ends are pivoted at 4, 4' (not shown) to sliders 14 which are also displaceable in the $y$-direction along the paths 13. The lower ends of each pair of levers 1 and 2 near the pivot points 4 and 5 are biased together by tension springs 15 whilst the members 14 are biased against movement to the right by means of tension springs 16. Traction wires W1, W1' are respectively coupled to the electrode 11 at the pivotal positions 9, 9' the wires passing round respective pulleys P1, P1' which are pivotally mounted with respect to a support frame.

If now the sliders 14 are maintained fixed then translational displacement of the sliders 12 along the pathways 13 will result in the translational displacement of the electrode 11 in the $x$-direction. It will be realized that the tension springs 15 act to inhibit displacement apart of the sliders 12 and 14 apart, i.e. acts against a downward displacement of the electrode 11 in the $x$-direction. On the other hand a traction force applied to the wires W1 will act in the opposite direction and thus serve to maintain the electrode 11 in the desired position.

Simultaneous traction forces applied to both wires W1, W1' result in a desired downward displacement of the electrode 11 in the $x$-direction whilst simultaneous controlled release of the traction wires W1, W1' results in an upward displacement of the electrode 11 in the $x$-direction under the influence of the tension springs 15. In this way simultaneous adjustment of the wires W1, W1' results in translational displacement of the electrode 11 in the $x$-direction.

If now the slider 14 is no longer maintained fixed but is pulled by wires W2, W2' to the right against the restoring force exerted by the tension springs 16 the lever assembly as a whole will be moved to the right. In this way, adjustment of the wires W2, W2' results in the displacement of the electrode 11 in the $y$-direction. Provided the distance between the positions of points 9, 9' on the electrode 11 and the pulleys P1, P1', respectively is large compared with the desired movement of the electrode in the $y$-direction, this movement in the $y$-direction, as a result of adjustment of the wires W2, W2' will be accompanied only by a very negligible movement of the electrode in the $x$-direction. (In a practical example of the control system in accordance with the invention the maximum displacement of the electrode in the $y$-direction which it is desired to achieve was ± 10 mm and in the particular arrangement the distance from the positions of points 9, 9' of the electrode to the pulley P1, P1', respectively, was 80 mm and in consequence the maximum $y$ displacement was accompanied by a displacement in the $x$-direction of only 0.6 millimeters).

Figure 4:
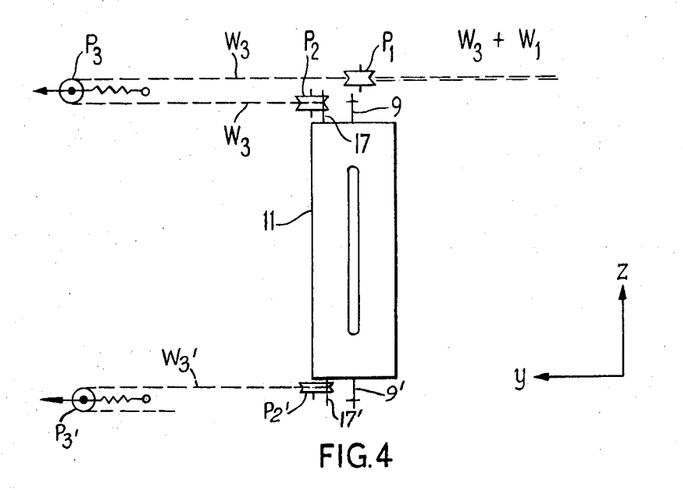
Figure 5:
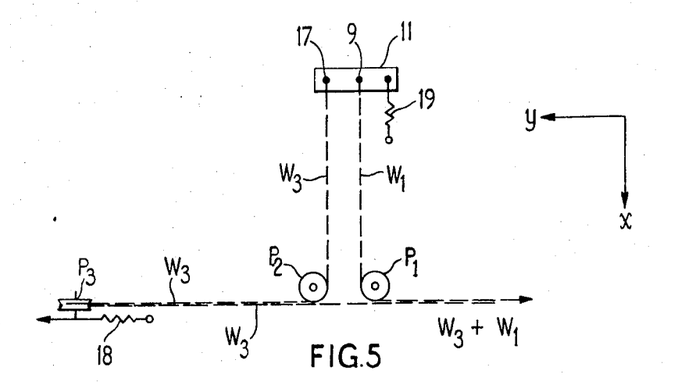
Figure 6:
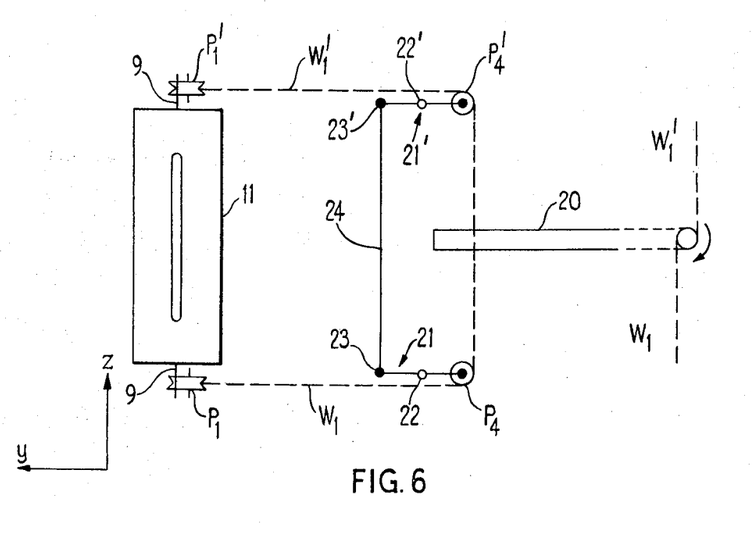

Now, as seen in FIGS. 4 and 5 of the drawings, there are attached to edges of the electrode 11 at a position 17, 17' further traction wires W3, W3' which pass downwardly in the $x$-direction and around pulleys P2, P2' pivotally mounted with respect to a fixed frame and then, in the $y$-direction around a displaceable pulley P3, P3', respectively, so as to be coupled to the traction wire W1, W1', respectively, (see FIG. 6). The pulleys P3, P3' are provided with means for displacing them to the left against the biasing effect of tension springs 18 whilst the electrode 1 is biased against rotation about the pivotal points 9, 9' under the influence of the traction wires W3, W3' by the provision of tension springs 19 coupled to the edges of the electrode 11 at the sides thereof remote from the points 17, 17'.

If now the pulleys P3, P3' are maintained fixed and both traction wires W1, W1' are pulled (the traction wires W3, W3' being coupled to one of the traction wires W1, W1' respectively,) then the electrode 11 is displaced as before in the $x$-direction whilst its orientation around an axis extending in the $z$ direction is not changed.

If, however, independently of the position of the electrode 11 in the $x$ or $y$-direction the pulleys P3, P3' are displaced the electrode 11 will perform a rotary motion around an axis extending in the $\bar{z}$-direction.

If now, as seen in FIG. 6 of the drawings the traction wires W1, W1' are arranged to pass around pulleys P4, P4', respectively, and are then coupled to a rod 20 the wires W1, W1' can be simultaneously displaced by rotation of the rod 20. The pulleys P4, P4' are, in their turn, pivoted at the end or rods 21, 21', the rods 21, 21' themselves being pivoted at their mid-points 22, 22' to a fixed frame and being coupled at their end points 23, 23' by means of a tie rod 24, the tie rod 24, rods 21, 21' and wires W1, W1' constituting a parallelogram.

Pivotal displacement of either of the rods 21, 21' about their mid-point pivots 22, 22' results in a linear displacement of the tie rod 24 and in this way one of the traction wires W1, W1' is tensioned whilst the other is released thereby facilitating the rotation of the electrode 11 about the $y$ axis without, however, modifying its mid-position. This pivotal displacement of the rods 21, 21' and the translational displacement of the tie rod 24 is effected by rotation of rod 20. If, now, in a manner similar to the coupling of the traction wires W1, W1' to the command rod 20 shown in FIG. 6 of the drawings, the traction wires W2, W2' shown in FIG. 8 of the drawings are coupled to a further command rod (not shown) rotation of this further command rod will result in the displacement of the electrode along the $y$- direction. Similarly, by modifying the parallelogram now formed rotation about the x-direction can be ensured without, however, modifying its mod-position.

Figure 7:
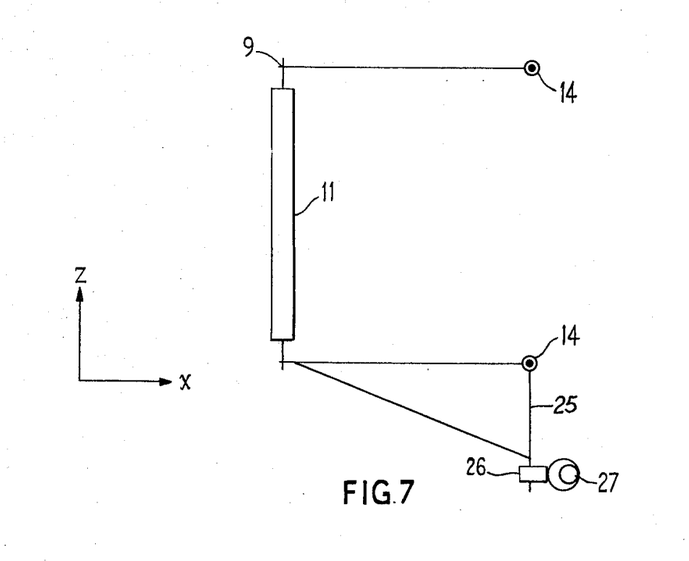

In order to provide for the movement of the electrode in the $\bar{z}$-direction, if such a movement is required, the coupling shown in FIG. 7 of the drawings is employed. FIG. 7 shows the electrode in the $x\bar{z}$ plane. In order to support the electrode 11 and prevent it falling in the vertical x-direction there is provided a link 25 which is linked in a rigid triangle to the pivot point 9 of the electrode 11. The link 25 is coupled at one end to the member 14 and at the other end is provided with a roller 26 which is arranged to roll in the y-direction. In order to allow for displacement of the electrode 11 in the $\bar{z}$-direction there is furthermore provided an eccentric 27 against which the roller 26 bears and upon rotation of the eccentric 27 the required small displacement of the electrode 11 in the $\bar{z}$-direction can be achieved.

Reference will now be made to FIGS. 8 to 11 of the drawings in which are shown in detail the application of the control system, schematically described above for the positioning of an extraction electrode 11 in an isotope mass separator of the electromagnetic type.

It will be realized that the extraction electrode 11, being located in the vaccum chamber, the control mechanism itself must also be located in the vacuum chamber but the controls thereof must be accessible from outside the vacuum chamber.

Very little space is available for accommodating the control mechanism and, in the construction now to be described the entire mechanism (except of course for the electrode supports) is located within a very shallow recess (of the order of 20 mm depth) formed inside the diaphragm plate and in consequence the mechanism can be adequately covered for protection against heat radiated from the source and against projected particles.

As seen in the drawings a diaphragm plate 31 has formed therein a central circular recess 32 bounded by the diaphragm side wall 33. Located in the central portion of the recess 32 is a gate valve (not shown). The entire mechanism now to be described is located in the recess 32 and is mounted with respect to the diaphragm plate 31.

The extraction electrode 11 described with reference to FIGS. 2 to 7 of the drawings but not seen in FIGS. 8 to 12 is pivotally supported at pivotal points 9 9' (not seen in FIGS. 8 to 12) between the upper extremities of a pair of levers 1 and 1' which are of similar construction. As can be seen from FIG. 11 of the drawings the lever 1' comprises a pair of bars 33a and 33b which, at their lower end are bolted to and embrace a slider block 34 having a throughgoing aperture 35 through which passes a guide rod 36. The upper end of the bars 33a and 33b are bent towards each other and are formed so as to constitute a journalling 37 for the pivotal point 9 of the extraction electrode 11 (see FIGS. 1 to 7). The guide rod 36 is mounted between mounting brackets 37 respectively secured to the plate 31.

The lever 1 is of identical construction to the lever 1' and will therefore not be described in further detail and is also mounted on a slider block 34 which is slidable on a guide rod 38 mounted between brackets 39 secured to the plate 31.

Figure 10:
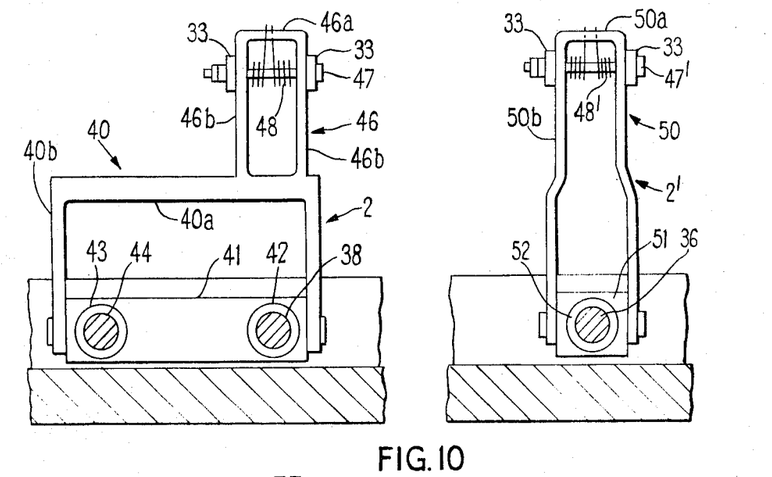
FIG. 10 is a sectional elevation of part of the mechanism shown in FIG. 8 taken along the line X—X.
Figure 11:
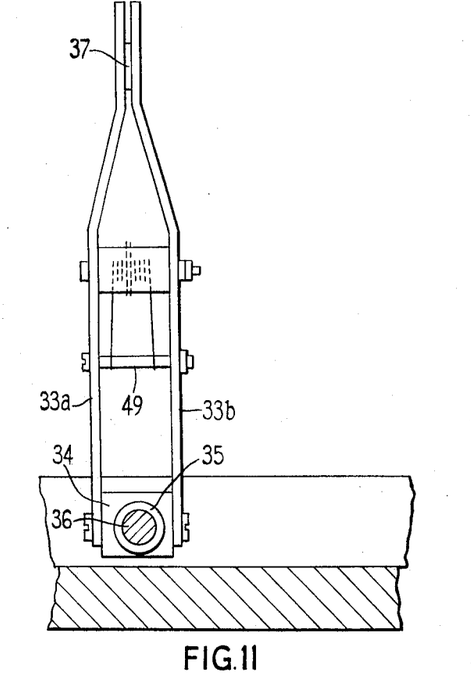
FIG. 11 is an elevation of the part of the mechanism shown in FIG. 9 taken along the line XI—XI.

Pivotally secured to the mid point of the levers 1 and 1' are shorter levers 2 and 2' whose construction is shown in FIG. 10 of the drawings.

The lever 2 comprises an inverted U-shaped member 40 having a web portion 40a and limbs 40b, the latter embracing and being bolted to a displaceable slider block 41 in which are formed a pair of parallel apertures 42 and 43, the guide rod 38 passing through the aperture 42 and a further parallel guide rod 44 passing through the aperture 43 and being mounted between brackets 45, the right hand brackets 45 constituting an extension of the right hand bracket 39. Formed integrally and extending upwardly from the web portion 40a is a further narrower inverted U-shaped member 46 having a web portion 46a and limbs 46b. The lever 2 is pivotally coupled to the lever 1 by means of a throughgoing pivot pin 47. A biasing spring 48 is mounted on the pin 47 and has ends which pass over the web 46a of the lever 2 and are anchored on a pin 49 secured to the lever 1 below the pivot pin 47. The effect of the biasing spring 48 is to bias together the levers 1 and 2.

The lever 2' is constituted by an inverted U-shaped member 50 having a web portion 50a and limb portions 50b. The lower free ends of the limb portions 50b embrace and are secured to a slider block 51 having a through-going aperture 51 through which passes the guide rod 36. In a manner similar to that described above, the lever 2' is pivotally coupled to the lever 1' by means of a pivot pin 47' about which is located a biasing spring 48' whose lower free ends are adapted to bear against a pin 49' supported by the lever 1'. In this way the levers 1' and 2' are biased together.

Coiled compression springs 16 and 16' (see FIG. 8) are respectively located on the guide rods 38 and 36, the right-hand ends of the springs bearing respectively against the fixed brackets 39 and 37 whilst the left-hand ends of the springs bear respectively against the levers 2 and 2' biasing these levers to the left.

The levers 2 and 2' are respectively coupled by means of wires $W_2$ and $W_2'$ (see FIG. 8) which pass around pulleys $P_5$ and $P_5'$ so as to be wound in opposite directions on a bobbin 61 integral with a control rod 62 which passes through the diaphragm plate via a vacuum tight seal, at one end and is journalled at the other end in a bracket 63 secured to the plate 31, the wire $W_2'$ being supported on its way by a pulley 64a fixedly mounted with respect to the plate 31.

Figure 8:
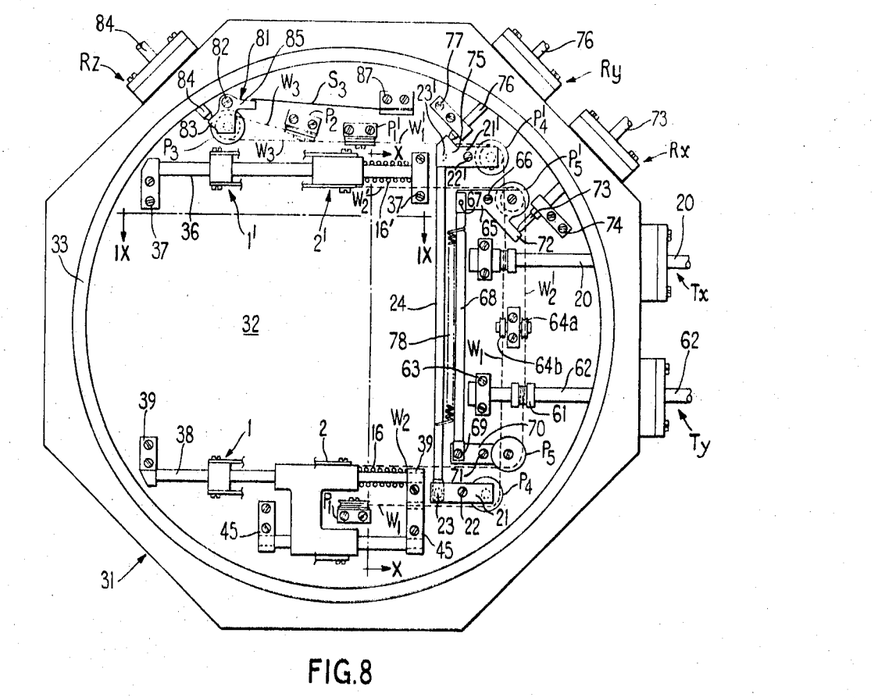
FIG. 8 is a plan view of the control system schematically shown in FIGS. 2 to 7.
Figure 9:
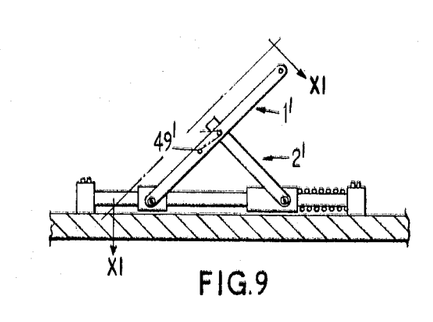
FIG. 9 is a sectional side elevation of a portion of the control mechanism.

The pulley $P_5'$ is pivotally mounted at a corner of a crank lever 65 which is in its turn pivotally mounted with respect to the plate 31 at a pivot position 66. One end of the crank lever 65 is pivotally mounted at a pivot 67 to one end of a coupling bar 68, the other end of the coupling bar 68 being pivotally mounted at a pivot 69 to one end of a lever 70 which is pivotally mounted at an intermediate pivotal position 71 to the plate 31 and which carries at its opposite end the pulley $P_5$. The crank lever 65 is provided with a nose portion 72 against which abuts an adjusting pin 73 journalled in a bracket 74 and passing through the plate 31 via a Wilson seal.

As described above with reference to FIGS. 2 to 6 of the drawings the extraction electrode 11 is coupled by means of wires W1, W1' which pass around fixed pulleys $P_1$ and $P_1'$ and relatively displaceable pulleys $P_4$ and $P_4'$ so as to be wound around the control rod 20 which passes through the diaphragm plate 31, the wire W1 being supported by a fixed pulley 64b.

The pulley $P_4'$ is mounted at one end of a crank lever 21' which is pivotally mounted at an intermediate position on a pivot 22', the other end of the crank lever 21' being pivotally coupled via a pivot 23' one end of a rod 24 the opposite end of the rod 24 being pivotally coupled via a pivot 23 to a crank lever 21, the opposite end of which carries the pulley $P_4$ and which is pivotally mounted via a pivot 22 on the plate 31. The crank lever 21' is provided with a nose 75 against which abuts a control pin 76 supported by a bracket 77 mounted on the plate 31, which control pin 76 passes through the plate 31. The rods 24 and 68 are coupled together by means of a tensioning spring 78.

Furthermore, as shown schematically in FIGS. 3 and 4 of the drawings there is coupled to one end of the extraction electrode 11 at a location 17 a wire W3 which passes round a pulley $P_2$ which, as seen clearly in FIG. 8 of the drawings is fixedly mounted with respect to the plate 31 and then round a pulley $P_3$. The latter is mounted on a movable crank lever 81 which is pivotally mounted on a pivot 82 with respect to the plate 31 and which is provided with an abutment nose 83 against which bears a control pin 84 which passes through the plate 31. The crank lever 81 is furthermore provided with an abutment 85 against which bears a biasing cantilever spring S3 which is fixedly mounted at its other end on a bracket 87 secured to the plate 31.

The operation of the control mechanism to impart to the extraction electrode 11 the five different kinds of movements, (movement in the $z$-direction is not considered here seeing that the direction of the slit in the extraction electrode is in the z direction) has already been described with reference to the schematic diagrams in FIGS. 2 to 6 and this description will now be correlated with the mechanism described in detail with reference to FIGS. 8 to 11 of the drawings.

Translational displacement of the extraction electrode in the x direction is effected by rotation of the control rod 20. This rotation results in the simultaneous tensioning or slackening of the wires W1 and W1' and, as explained above with reference to FIGS. 3 and 6 of the drawings, the extraction electrode undergoes translation in the x-direction.

Translational displacement of the extraction electrode in the y-direction is effected by rotation of the control rod 62 which causes the simultaneous tensioning or slackening of the wires $W_2, W_2'$.

The rotational displacement of the extraction electrode about the $z$-axis is effected by rotation of the control pin 84 which results in the pivotal displacement of the crank lever 81, displacement of the pulley $P_3$ and consequent adjustment of the wire $W_3$.

Rotational displacement of the extraction electrode about the y axis is effected by rotation of the control pin 76 which results in the pivotal displacement of the crank lever 21' as a result of which one of the wires W1, W1' is stretched whilst the other of the wires W1, W1' is slackened.

Finally, rotational displacement of the extraction electrode above the x-axis is effected by rotation of the control pin 73 as a result of which the crank lever 65 is pivoted thereby stretching one of the wires $W_2, W_2'$ and slackening the other wire $W_2, W_2'$.

It will therefore be readily seen that all the necessary, substantially independent displacements can be imparted to the extraction electrode by the adjustment of controls which extend out of the vacuum system whilst the control mechanism itself is readily accommodated in a very shallow space in the diaphragm plate in which it can be readily protected against heat and projected particles. All this is achieved with minimally displaceable components in the vacuum space itself.

I claim:

1. A composite control mechanism comprising:
   a. a pair of similar control systems, each of which comprises a pair of levers, the first of which is substantially twice as long as the second, both levers of a pair having one end biased together and pivotally articulated to respective slider blocks slidable on parallel guide rods mounted on a frame, the other ends of the second levers of each pair being articulated to the respectively first levers at the mid-points thereof, the other ends of the first levers of each pair being pivotally articulated to respective ends of an object to be positioned;
   b. first traction wires respectively coupled to each end of the object adjacent its articulation point with the respective first lever, and passing in a first orthogonal direction around respective first pulleys that are pivotally mounted on the frame; and
   c. first means for selectively tightening and slackening the first traction wires so as to translationally displace the object in said first orthogonal direction.

2. A composite control mechanism according to claim 1 including second traction wires respectively coupled to the slider blocks on the one end of each of the second levers of the control systems, and second means for selectively tightening and slackening the second traction wires so as to translationally displace the object in a second orthogonal direction.

3. A composite control mechanism according to claim 2 including a third traction wire, coupled to one end of the object adjacent its articulation point with the associated first lever, and passing in the first orthogonal direction about a third pulley pivotally mounted on the frame, and terminating in a coupling to one of the first traction wires, and third means to displace the third traction wire for rotatably displacing said object about a third orthogonal direction.

4. A composite control mechanism according to claim 3, wherein eccentrically rotatable means is provided coupled to said object which when rotated displaces said object translationally in the third orthogonal direction.

5. A composite control mechanism according to claim 4, wherein the first traction wires pass to said first means over a pair of said first pulleys which are respectively mounted on a pair of pivoted levers so as to constitute a first parallelogram with said levers and a tie rod and fourth means for displacing said first parallelogram about the pivots of said levers so as to displace said object rotatably about an axis transverse to said first orthogonal direction.

6. A composite control mechanism according to claim 5, wherein said second traction wires pass to said second means over a further pair of pulleys which are respectively mounted on a further pair of pivoted levers so as to constitute a second parallelogram with said levers and a further tie rod, and fifth means for displacing said second parallelogram about the pivots of said levers so as to displace said object rotatably about an axis transverse to said second orthogonal direction.

7. A composite control mechanism according to claim 6 for the fine positional adjustment of an extraction electrode in an isotope mass separator of the electro-magnetic sector type and including a recessed diaphragm plate in which said guide rods, first, second and third pulleys and levers are mounted, said first and second means respectively being constituted by control rods which pass through said plate and about which said first and second traction wires are respectively wound or unwound, said third traction wire passing over a crank lever pivotally mounted with respect to the plate, said third means being constituted by a first control pin passing through the plate and designed to pivotally displace said crank lever, said fourth and fifth means respectively constituted by second and third control pins passing through the plate and designed to displace said parallelograms.

* * * * *